US012394376B2

(12) United States Patent
Yang

(10) Patent No.: US 12,394,376 B2
(45) Date of Patent: Aug. 19, 2025

(54) DISPLAY DEVICE AND DRIVING METHOD THEREOF

(71) Applicant: LG Display Co., Ltd., Seoul (KR)

(72) Inventor: Jun Hyeok Yang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/503,457

(22) Filed: Nov. 7, 2023

(65) Prior Publication Data

US 2024/0221654 A1 Jul. 4, 2024

(30) Foreign Application Priority Data

Dec. 29, 2022 (KR) ........................ 10-2022-0188919

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2300/0842* (2013.01); *G09G 2310/0286* (2013.01); *G09G 2320/0214* (2013.01)

(58) Field of Classification Search
CPC ................................................ H10K 59/00–95
See application file for complete search history.

(56) References Cited

U.S. PATENT DOCUMENTS

2020/0043421 A1* 2/2020 Kang .................. G09G 3/3275

FOREIGN PATENT DOCUMENTS

| | | | | |
|---|---|---|---|---|
| CN | 111048040 A | * | 4/2020 | G09G 3/3208 |
| KR | 102344969 B1 | * | 1/2022 | |
| KR | 102379807 B1 | * | 3/2022 | |

OTHER PUBLICATIONS

KR-102344969-B1 (Year: 2022).*
CN-111048040-A (Year: 2020).*
KR-102379807-B1 (Year: 2022).*

* cited by examiner

*Primary Examiner* — Sanjiv D. Patel
(74) *Attorney, Agent, or Firm* — Fenwick & West LLP

(57) ABSTRACT

Disclosed is a display device including a display panel having a sub-pixel, a panel driving circuit configured to supply a data voltage to the sub-pixel, a panel sensing circuit configured to sense the sub-pixel, and a stabilization circuit disposed between a reference line connected to the sub-pixel and a sensing channel of the panel sensing circuit and configured to electrically stabilize the reference line such that charging of a voltage or current in the reference line is smoothly performed.

15 Claims, 18 Drawing Sheets

DISPLAY DEVICE AND DRIVING METHOD THEREOF

CROSS-REFERENCE TO RELATED APPLICATION

This application claims the benefit of Republic of Korea Patent Application No. 10-2022-0188919 filed on Dec. 29, 2022, which is hereby incorporated by reference in its entirety.

BACKGROUND

Field

The present disclosure relates to a display device and a driving method thereof.

Discussion of the Related Art

With the development of information technology, the market for display devices that are media for connection between users and information is growing. Accordingly, display devices such as a light emitting display (LED), a quantum dot display (QDD), and a liquid crystal display (LCD) have been increasingly used.

The above display devices each include a display panel including sub-pixels, a driver which outputs a driving signal for driving of the display panel, and a power supply which generates power to be supplied to the display panel or the driver.

In such a display device, when sub-pixels formed in a display panel are supplied with driving signals, for example, a scan signal and a data signal, a selected one thereof may transmit light therethrough or directly emit light, thereby displaying an image.

SUMMARY

Accordingly, the present disclosure is directed to a display device and a driving method thereof that substantially obviate one or more problems due to limitations and disadvantages of the related art.

The present disclosure minimizes or at least reduces noise resulting from a foreign object or the influence thereof by electrically stabilizing a reference line used for sensing of an element included in a sub-pixel. In addition, the present disclosure improves display quality by forming a condition capable of acquiring a relatively accurate sensed value and performing compensation based on the condition. In addition, the present disclosure minimizes a signal delay problem and a switching noise problem resulting from a parasitic RC (parasitic resistor and parasitic capacitor) component which may be induced in the reference line.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a display device includes a display panel having a sub-pixel, a panel driving circuit configured to supply a data voltage to the sub-pixel, a panel sensing circuit configured to sense the sub-pixel, and a stabilization circuit disposed between a reference line connected to the sub-pixel and a sensing channel of the panel sensing circuit and configured to electrically stabilize the reference line such that charging of a voltage or current in the reference line is smoothly performed.

The stabilization circuit may be disposed on a board adjacent to the sensing channel of the panel sensing circuit.

The stabilization circuit may operate such that the reference line is floated for a predetermined time.

The stabilization circuit may include a stabilization switch having a first electrode connected to the sensing channel of the panel sensing circuit, a second electrode connected to the reference line, and a control electrode connected to a control signal line.

The stabilization switch may be kept turned off for a predetermined time to separate a leakage path formed in the reference line in a sensing operation of the sub-pixel, and may then be temporarily turned on for sensing of the sub-pixel.

The panel sensing circuit may include a sampling circuit configured to sense the sub-pixel through the reference line, and the stabilization switch may operate synchronously with a sampling switch included in the sampling circuit.

The panel sensing circuit may include a sampling circuit configured to sense the sub-pixel through the reference line, and the stabilization switch may operate asynchronously with a sampling switch included in the sampling circuit.

The panel sensing circuit may include a sampling circuit configured to sense the sub-pixel through the reference line, and the stabilization switch may be turned on later than a sampling switch included in the sampling circuit.

The stabilization switch may be turned on later and turned off earlier than the sampling switch included in the sampling circuit.

In another aspect of the present disclosure, there is provided a method of driving a display device which includes a display panel having a sub-pixel, a panel driving circuit configured to supply a data voltage to the sub-pixel, a panel sensing circuit configured to sense the sub-pixel, and a stabilization circuit disposed between a reference line connected to the sub-pixel and a sensing channel of the panel sensing circuit. The method includes applying a reference voltage for sensing through the reference line, turning off the stabilization circuit to float the reference line such that charging of the reference voltage for sensing applied to the reference line is smoothly performed, and turning on the stabilization circuit to sense the reference line, and electrically connecting the reference line and the sensing channel to each other.

It is to be understood that both the foregoing general description and the following detailed description of the present disclosure are exemplary and explanatory and are intended to provide further explanation of the disclosure as claimed.

The stabilization circuit may include a stabilization switch operating such that the reference line is floated for a predetermined time.

The stabilization switch may be kept turned off for a predetermined time to separate a leakage path formed in the reference line in a sensing operation of the sub-pixel, and is then temporarily turned on for sensing of the sub-pixel.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

A display device according to the present disclosure may be implemented as a television, a video player, a personal computer (PC), a home theater, an automotive electric device, or a smartphone, but is not limited thereto. The display device according to the present disclosure may be implemented by a light emitting display (LED), a quantum dot display (QDD), or a liquid crystal display (LCD). For convenience of description, an LED device that directly emits light based on an inorganic light emitting diode or an organic light emitting diode will hereinafter be taken as an example of the display device according to the present disclosure.

Figure 1:
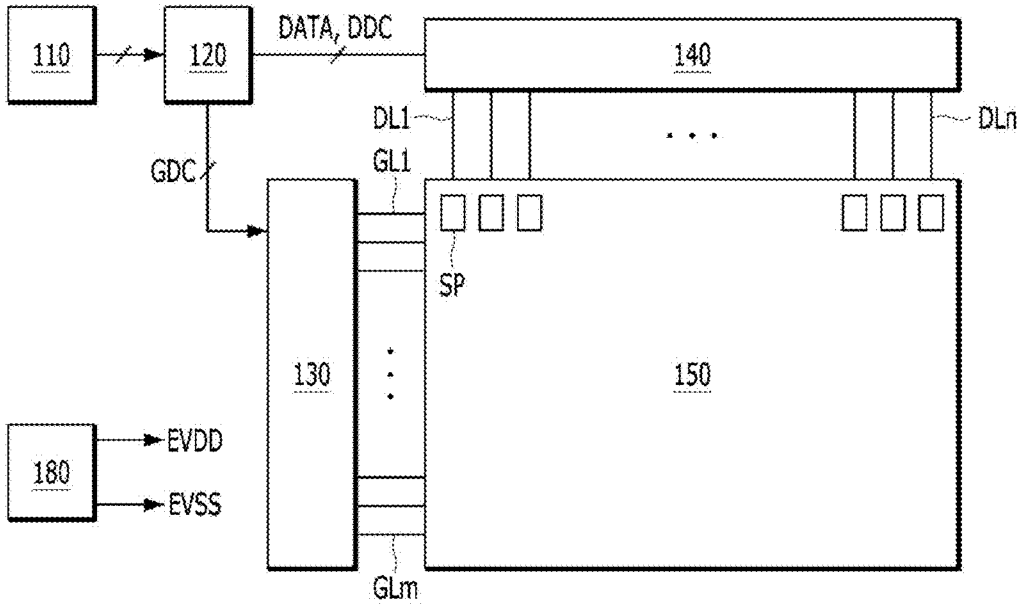
FIG. 1 is a block diagram schematically showing the configuration of a light emitting display device according to one embodiment.
Figure 2:
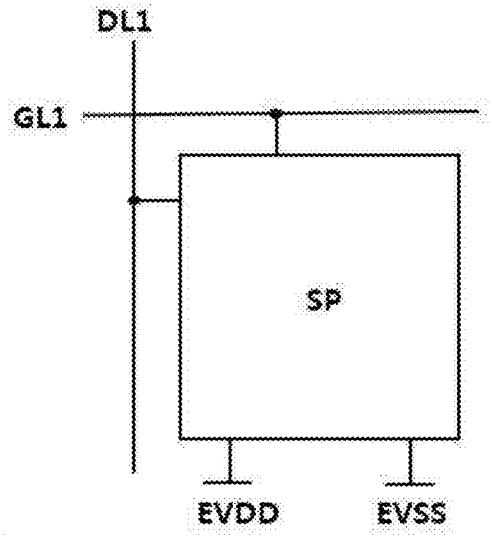
FIG. 2 is a schematic block diagram of a sub-pixel shown in FIG. 1 according to one embodiment.
Figure 3:
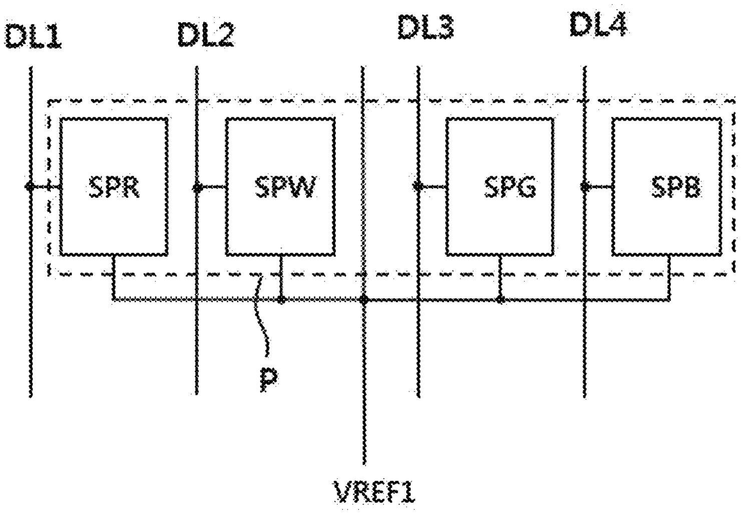
FIG. 3 is an exemplary diagram of a pixel composed of sub-pixels according to one embodiment.

FIG. 1 is a block diagram schematically showing the configuration of an LED device according to one embodiment, FIG. 2 is a schematic block diagram of a sub-pixel shown in FIG. 1 according to one embodiment, and FIG. 3 is an exemplary diagram of a pixel composed of sub-pixels according to one embodiment.

As shown in FIGS. 1 to 3, the LED device may include an image supply 110, a timing controller 120, a scan driver 130, a data driver 140, a display panel 150, and a power supply 180.

The image supply (set or host system) 110 may output various driving signals together with an image data signal externally supplied or an image data signal stored in an internal memory. The image supply 110 may supply the data signal and the various driving signals to the timing controller 120.

The timing controller 120 may output a gate timing control signal GDC for control of operation timing of the scan driver 130, a data timing control signal DDC for control of operation timing of the data driver 140, and various synchronization signals (a vertical synchronization signal Vsync and a horizontal synchronization signal Hsync). The timing controller 120 may supply a data signal DATA supplied from the image supply 110 together with the data timing control signal DDC to the data driver 140. The timing controller 120 may be formed in the form of an integrated circuit (IC) and mounted on a printed circuit board, but is not limited thereto.

The scan driver 130 may output a scan signal (or scan voltage) in response to the gate timing control signal GDC supplied from the timing controller 120. The scan driver 130 may supply the scan signal to sub-pixels included in the display panel 150 through gate lines GL1 to GLm. The scan driver 130 may be formed in the form of an IC or may be formed directly on the display panel 150 in a gate-in-panel (GIP) manner, but is not limited thereto.

The data driver 140 may sample and latch the data signal DATA in response to the data timing control signal DDC supplied from the timing controller 120, convert the resulting digital data signal into an analog data voltage based on a gamma reference voltage, and output the converted analog data voltage. The data driver 140 may supply the data voltage to the sub-pixels included in the display panel 150 through data lines DL1 to DLn. The data driver 140 may be formed in the form of an IC and mounted on the display panel 150 or mounted on the printed circuit board, but is not limited thereto.

The power supply 180 may generate a first voltage of a high level and a second voltage of a low level based on an external input voltage externally supplied. The power supply 180 may output the first voltage through a first voltage line EVDD and output the second voltage through a second voltage line EVSS. The power supply 180 may generate and output voltages (for example, a scan high voltage and a scan low voltage) required to drive the scan driver 130 or voltages (for example, a drain voltage and a half-drain voltage) required to drive the data driver 140, as well as the first voltage and the second voltage.

The display panel 150 may display an image in response to a driving signal including the scan signal and the data voltage, the first voltage, and the second voltage. The sub-pixels of the display panel 150 may directly emit light. The display panel 150 may be manufactured based on a rigid or flexible substrate of glass, silicon, polyimide, or the like. For example, one sub-pixel SP may be connected to the first data line DL1, the first gate line GL1, the first voltage line EVDD, and the second voltage line EVSS, and may include a pixel circuit which is composed of a switching transistor, a driving transistor, a capacitor, an organic light emitting diode, etc.

The sub-pixel SP used in the LED device is complex in circuit configuration in that it directly emits light. Furthermore, there are various compensation circuits for compensating for deterioration of not only the organic light emitting diode, which emits light, but also the driving transistor, which supplies driving current required to drive the organic light emitting diode. In this regard, it should be noted that the sub-pixel SP is simply shown in block form.

The sub-pixels which emit light may include pixels including red, green and blue or pixels including red, green, blue and white. For example, one pixel P may include a red sub-pixel SPR connected to the first data line DL1, a white sub-pixel SPW connected to the second data line DL2, a green sub-pixel SPG connected to the third data line DL3, and a blue sub-pixel SPB connected to the fourth data line DL4. The red sub-pixel SPR, the white sub-pixel SPW, the green sub-pixel SPG and the blue sub-pixel SPB may be connected in common to a first reference line VREF1. The first reference line VREF1 may be used to sense deterioration, etc. of element(s) included in one of the red sub-pixel SPR, the white sub-pixel SPW, the green sub-pixel SPG and the blue sub-pixel SPB, which will hereinafter be described.

On the other hand, in the above description, the timing controller 120, the scan driver 130, the data driver 140, etc. have been described as if they were individual components. However, one or more of the timing controller 120, the scan driver 130 and the data driver 140 may be integrated into one IC depending on how the LED device is implemented. In addition, the pixel P in which the sub-pixels are arranged in the order of the red sub-pixel SPR, the white sub-pixel SPW, the green sub-pixel SPG and the blue sub-pixel SPB is shown as an example. However, the arrangement order and direction of the sub-pixels may be changed depending on how the LED device is implemented.

Figure 4:
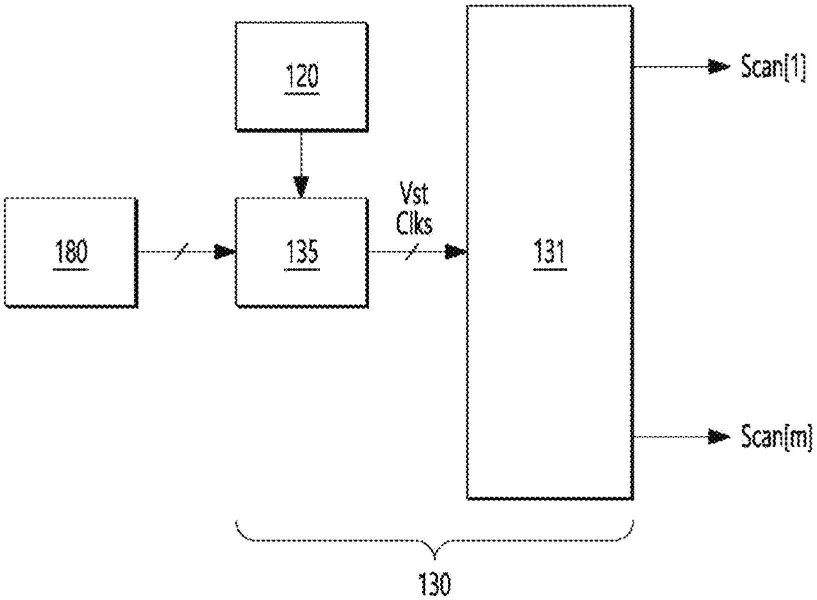
FIGS. 4 and 5 are block diagrams showing examples of the configuration of a gate-in-panel (GIP)-type scan driver according to one embodiment.
Figure 5:
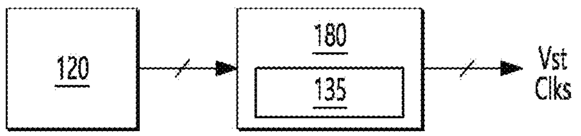
Figure 6:
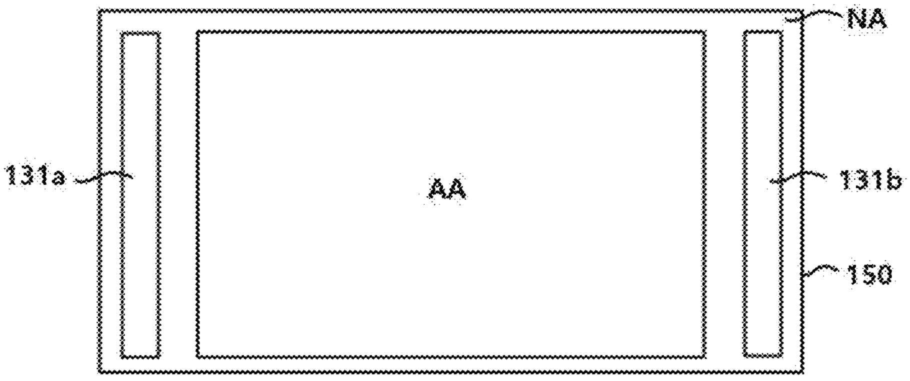
FIG. 6 is a view showing an example of the layout of the GIP-type scan driver according to one embodiment.

FIGS. 4 and 5 are block diagrams showing examples of the configuration of a gate-in-panel (GIP)-type scan driver according to one embodiment, and FIG. 6 is a view showing an example of the layout of the GIP-type scan driver according to one embodiment.

As shown in FIG. 4, the GIP-type scan driver may include a shift register 131 and a level shifter 135. The level shifter 135 may generate driving clock signals Clks and a start signal Vst based on signals and voltages output from the timing controller 120 and power supply 180.

The shift register 131 may operate based on the signals Clks and Vst output from the level shifter 135 and output scan signals Scan[1] to Scan[m] capable of turning on or off transistors formed in the display panel. The shift register 131 may be formed on the display panel in the form of a thin film in a GIP manner.

As shown in FIG. 5, unlike the shift register 131, the level shifter 135 may be independently formed in the form of an IC or may be included in the power supply 180. However, this is merely one example, and the level shifter 135 is not limited thereto.

As shown in FIG. 6, shift registers 131*a* and 131*b* of the GIP-type scan driver which output scan signals may be disposed in a non-active area NA of the display panel 150. Although the shift registers 131*a* and 131*b* are disposed at the left and right parts of the non-active area NA of the display panel 150 as an example, they may be disposed at the upper and lower parts of the non-active area NA of the display panel 150 or may be disposed in an active area AA of the display panel 150.

Figure 7:
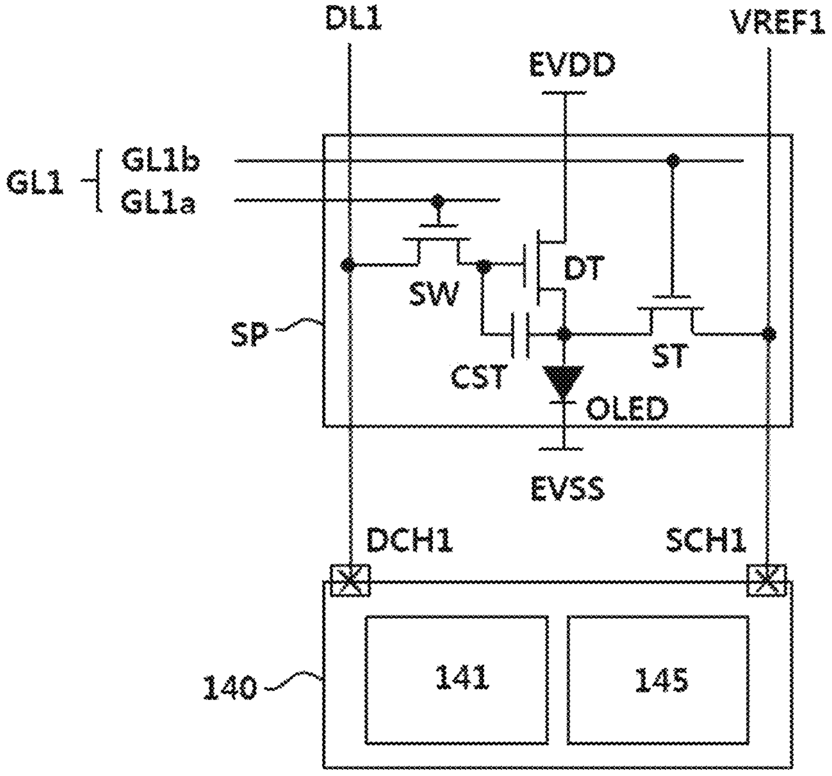
FIGS. 7 and 8 are exemplary diagrams of a sub-pixel and a data driver according to a first embodiment of the present disclosure.
Figure 8:
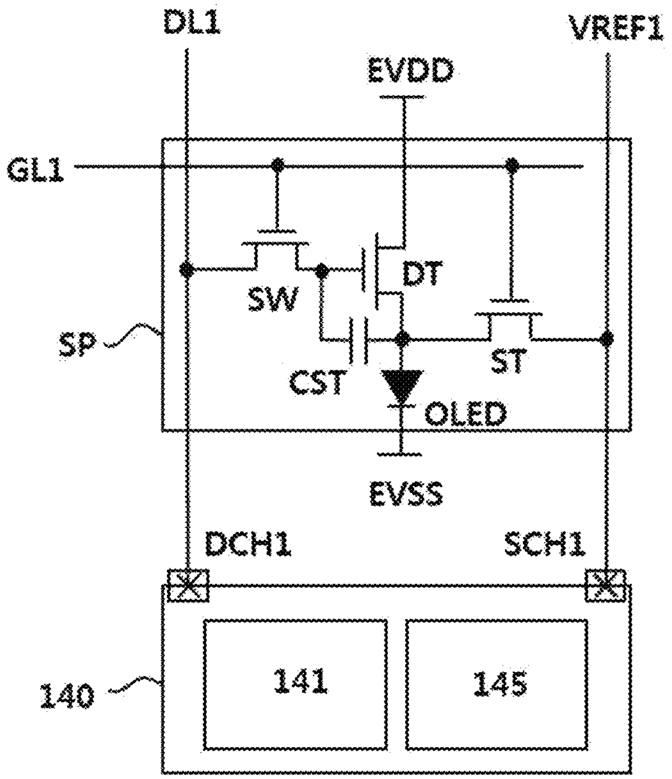

FIGS. 7 and 8 are exemplary diagrams of a sub-pixel and a data driver according to a first embodiment of the present disclosure.

As shown in FIGS. 7 and 8, one sub-pixel SP may include a switching transistor SW, a driving transistor DT, a sensing transistor ST, a capacitor CST, and an organic light emitting diode OLED.

The driving transistor DT may have a gate electrode connected to a first electrode of the capacitor CST, a first electrode connected to the first voltage line EVDD, and a second electrode connected to an anode electrode of the organic light emitting diode OLED. The capacitor CST may have the first electrode connected to the gate electrode of the driving transistor DT and a second electrode connected to the anode electrode of the organic light emitting diode OLED. The organic light emitting diode OLED may have the anode electrode connected to the second electrode of the driving transistor DT and a cathode electrode connected to the second voltage line EVSS.

The switching transistor SW may have a gate electrode connected to a first scan line GL1*a* included in the first gate line GL1, a first electrode connected to the first data line DL1, and a second electrode connected to the gate electrode of the driving transistor DT. The sensing transistor ST may have a gate electrode connected to a second scan line GL1*b* included in the first gate line GL1, a first electrode connected to the first reference line VREF1, and a second electrode connected to the anode electrode of the organic light emitting diode OLED.

The sensing transistor ST is a kind of compensation circuit which is additionally provided to compensate for deterioration (in a threshold voltage, mobility, or the like) of the driving transistor DT or organic light emitting diode OLED. The sensing transistor ST may enable physical threshold voltage sensing based on a source follower operation of the driving transistor DT. The sensing transistor ST may operate to acquire a sensed voltage through a sensing node defined between the driving transistor DT and the organic light emitting diode OLED.

On the other hand, the first gate line GL1 may be integrated into one as in FIG. 8, without being divided into the first scan line GL1*a* and the second scan line GL1*b* as in FIG. 7. That is, the switching transistor SW and the sensing transistor ST may be connected in common to the first gate line GL1 and be turned on or off at the same time.

The data driver 140 may include a panel driving circuit 141 configured to drive the sub-pixel SP, and a panel sensing circuit 145 configured to sense the sub-pixel SP. The panel driving circuit 141 may be connected to the first data line DL1 through a first output channel DCH1 and connected to the first reference line VREF1 through a first sensing channel SCH1. The panel driving circuit 141 may output a data voltage for driving of the sub-pixel SP through the first output channel DCH1. The panel sensing circuit 145 may acquire a sensed voltage from the sub-pixel SP through the first sensing channel SCH1.

Figure 9:
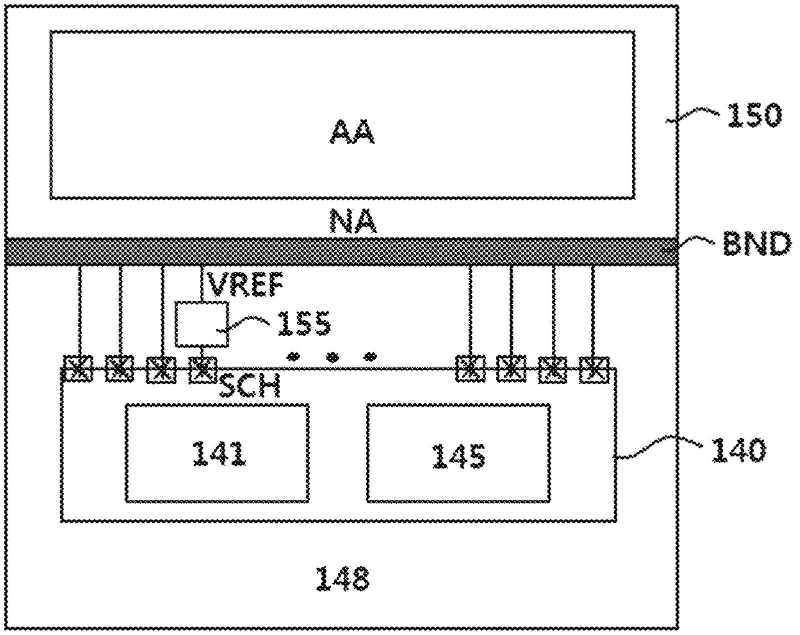
FIGS. 9 and 10 are exemplary diagrams of a stabilization circuit disposed adjacent to a channel of the data driver according to the first embodiment of the present disclosure.
Figure 10:
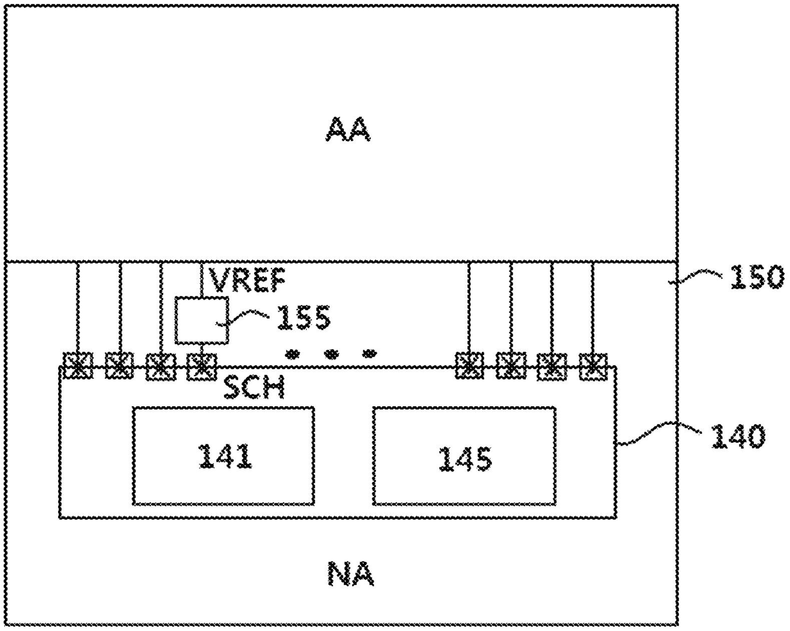

FIGS. 9 and 10 are exemplary diagrams of a stabilization circuit disposed adjacent to a channel of the data driver according to the first embodiment of the present disclosure.

As shown in FIGS. 9 and 10, an LED device according to the first embodiment may include a stabilization circuit 155. The stabilization circuit 155 may be located adjacent to a channel of the data driver 140. The stabilization circuit 155 may be located between a sensing channel SCH of the data driver 140 and a reference line VREF.

The stabilization circuit 155 may act to electrically stabilize the reference line VREF. In detail, the stabilization circuit 155 may act to stabilize the reference line VREF such that occurrence of leakage current in the reference line VREF is blocked or prevented and charging of a voltage or current in the reference line VREF is smoothly performed.

As shown in FIG. 9, the data driver 140 may be mounted on a circuit board 148. In this case, the stabilization circuit 155 may be located on the circuit board 148 to be adjacent to the sensing channel SCH of the data driver 140.

As shown in FIG. 10, the data driver 140 may be mounted on the non-active area NA of the display panel 150. In this case, the stabilization circuit 155 may be located on the non-active area NA of the display panel 150 to be adjacent to the sensing channel SCH of the data driver 140. On the other hand, in FIGS. 9 and 10, the stabilization circuit 155 is located on the circuit board 148 or the non-active area NA of the display panel 150 as an example. However, it should be interpreted that the stabilization circuit 155 may be located outside the data driver 140 adjacent to the sensing channel SCH thereof depending on a mounted position of the data driver 140.

Figure 11:
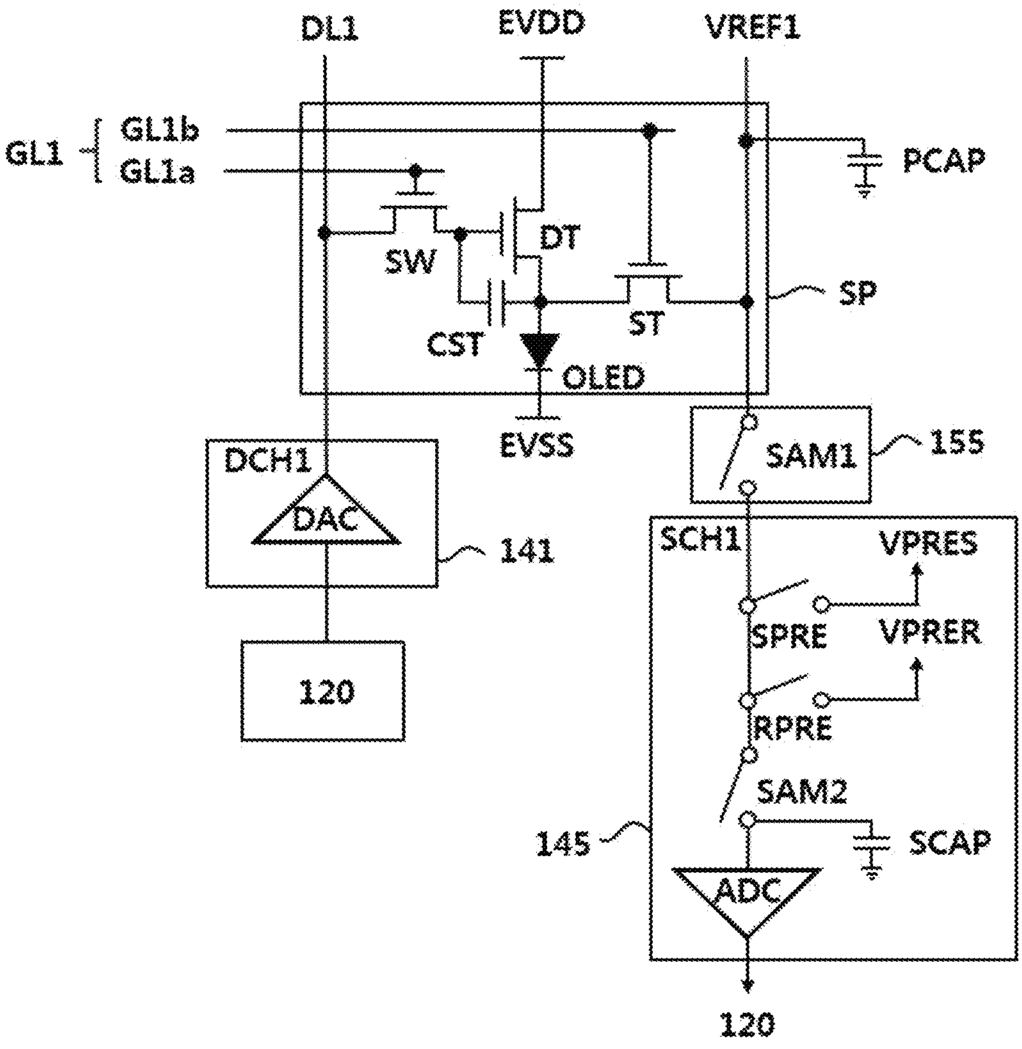
FIG. 11 is a detailed diagram of a stabilization circuit disposed adjacent to a channel of a data driver according to a second embodiment of the present disclosure and a circuit included in the data driver.
Figure 12:
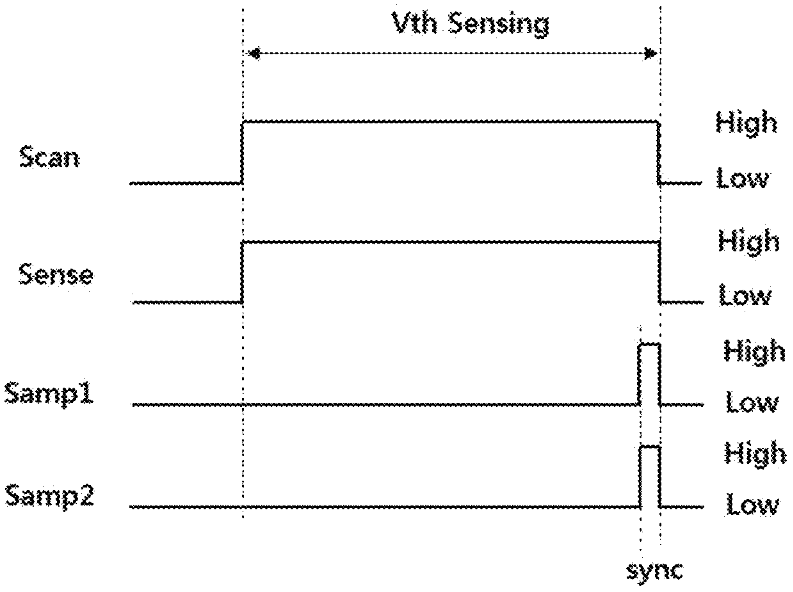
FIG. 12 is a waveform diagram illustrating a driving method according to the second embodiment of the present disclosure.
Figure 13:
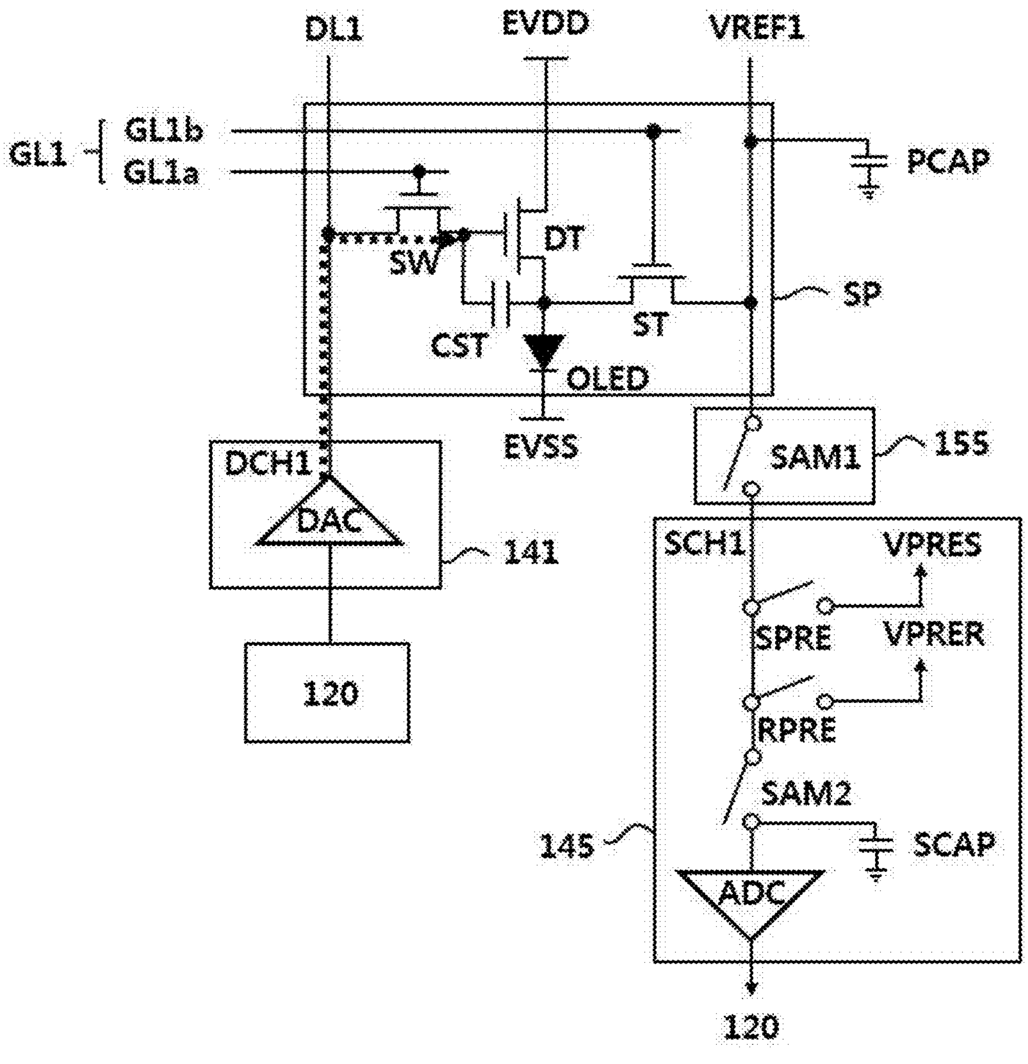
FIGS. 13 and 14 are views illustrating operation states of a device based on the waveform diagram of FIG. 12 according to one embodiment.
Figure 14:
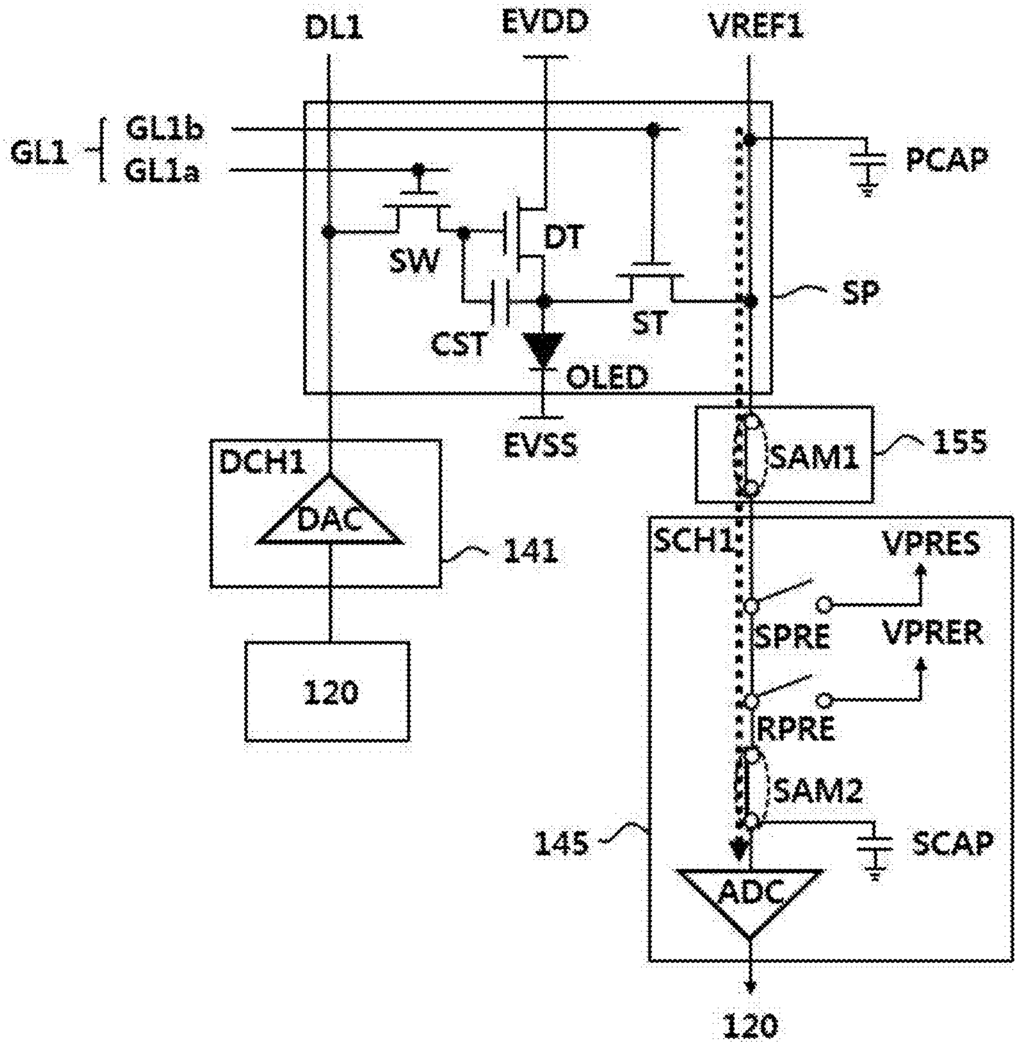

FIG. 11 is a detailed diagram of a stabilization circuit disposed adjacent to a channel of a data driver according to a second embodiment of the present disclosure and a circuit included in the data driver, FIG. 12 is a waveform diagram illustrating a driving method according to the second embodiment of the present disclosure, FIGS. 13 and 14 are views illustrating operation states of a device based on the waveform diagram of FIG. 12 according to one embodiment, and FIGS. 15 to 18 are views illustrating a difference between before and after application of the second embodiment of the present disclosure.

As shown in FIG. 11, the stabilization circuit 155 may include a stabilization switch SAM1. The stabilization switch SAM1 may have a first electrode connected to a first sensing channel SCH1 of a panel sensing circuit 145, a second electrode connected to a first reference line VREF1 connected to a sub-pixel SP, and a control electrode connected to a control signal line. A transistor having an excellent off characteristic may be selected as the stabilization switch SAM1.

A panel driving circuit 141 may include a digital-to-analog converter DAC to output a data voltage for sensing, a black data voltage, or a data voltage for display. The panel driving circuit 141 in FIG. 11 may correspond to a circuit in charge of one output channel. The panel sensing circuit 145 may include a first voltage circuit SPRE, a second voltage circuit RPRE, a sampling circuit SAM2, and an analog-to-digital converter ADC to output and sense a voltage to the sub-pixel SP and the first reference line VREF1. The panel sensing circuit 145 in FIG. 11 may correspond to a circuit in charge of one sensing channel.

The first voltage circuit SPRE and the second voltage circuit RPRE may perform a voltage output operation for initializing a node or circuit included in the sub-pixel SP or charging the node or circuit with a voltage of a specific level. The first voltage circuit SPRE and the second voltage circuit RPRE may include a first reference voltage source VPRES and a second reference voltage source VPRER, respectively. The first voltage circuit SPRE may output a first reference voltage based on the first reference voltage source VPRES, and the second voltage circuit RPRE may output a second reference voltage based on the second reference voltage source VPRER.

The first reference voltage may be defined as a voltage for use in a sensing mode (compensation mode) for deterioration compensation, and the second reference voltage may be defined as a voltage for use in a driving mode (normal mode) for image display. The first reference voltage may be set to a voltage lower than the second reference voltage. The sampling circuit SAM2 may perform a sampling operation for acquiring a sensed voltage through the first reference line VREF1. The sampling circuit SAM2 may include a sampling switch and a sampling capacitor SCAP to perform the sampling operation. The analog-to-digital converter ADC may convert an analog sensed voltage acquired by the sampling circuit SAM2 into a digital sensed voltage and output the converted digital sensed voltage.

The panel sensing circuit 145 may acquire a sensed voltage for compensation for deterioration of a driving transistor DT or organic light emitting diode OLED included in the sub-pixel SP through a sensing capacitor PCAP formed in the first reference line VREF1. The panel sensing circuit 145 may acquire the sensed voltage through the sampling capacitor SCAP formed in the sampling circuit SAM2, convert the acquired analog sensed voltage into a digital sensed voltage through the analog-to-digital converter ADC and output the converted digital sensed voltage. The sensed voltage output from the panel sensing circuit 145 may be transferred to the timing controller 120. The timing controller 120 may determine, based on the sensed voltage, whether the driving transistor DT or organic light emitting diode OLED included in the sub-pixel SP has been deteriorated and perform a compensation operation for compensating for such deterioration.

An LED device implemented according to the second embodiment of the present disclosure may operate in a driving mode (normal mode) for displaying an image on a display panel and a sensing mode (compensation mode) for sensing characteristics of element(s) included in the display panel, based on the panel driving circuit 141 and the panel sensing circuit 145.

In the sensing mode, sensing may be performed for compensation for deterioration (threshold voltage or mobility compensation) of the driving transistor DT or compensation for deterioration (threshold voltage compensation) of the organic light emitting diode OLED. FIG. 12 illustrates a partial section (after the first reference voltage for sensing is output) of a threshold voltage Vth sensing operation of the driving transistor DT.

As shown in FIGS. 11 and 12, in the threshold voltage Vth sensing operation of the driving transistor DT, a switching transistor SW may be turned on in response to a first scan signal Scan of a high voltage High, and a sensing transistor ST may be turned on in response to a second scan signal Sense of the high voltage High. The sampling switch included in the sampling circuit SAM2 may be temporarily turned on in response to a sampling control signal Samp2 of the high voltage High, and the stabilization switch SAM1 included in the stabilization circuit 155 may be temporarily turned on in response to a stabilization switch signal Samp1.

As can be seen from FIGS. 12 to 14, the stabilization switch SAM1 included in the stabilization circuit 155 and the sampling switch included in the sampling circuit SAM2 may be synchronized with each other to be turned on at the same time or turned off at the same time. The reason will hereinafter be described.

Figure 15:
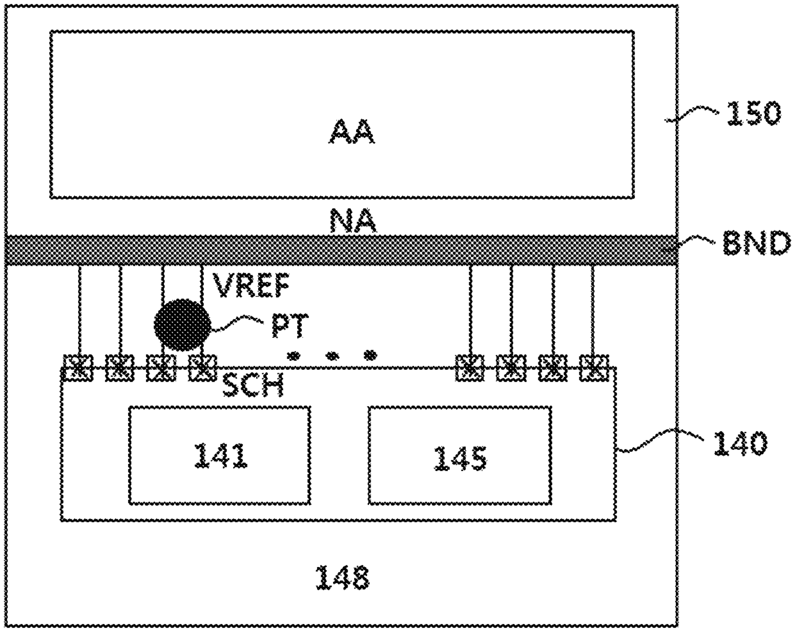
FIGS. 15 to 18 are views illustrating a difference between before and after application of the second embodiment of the present disclosure.
Figure 16:
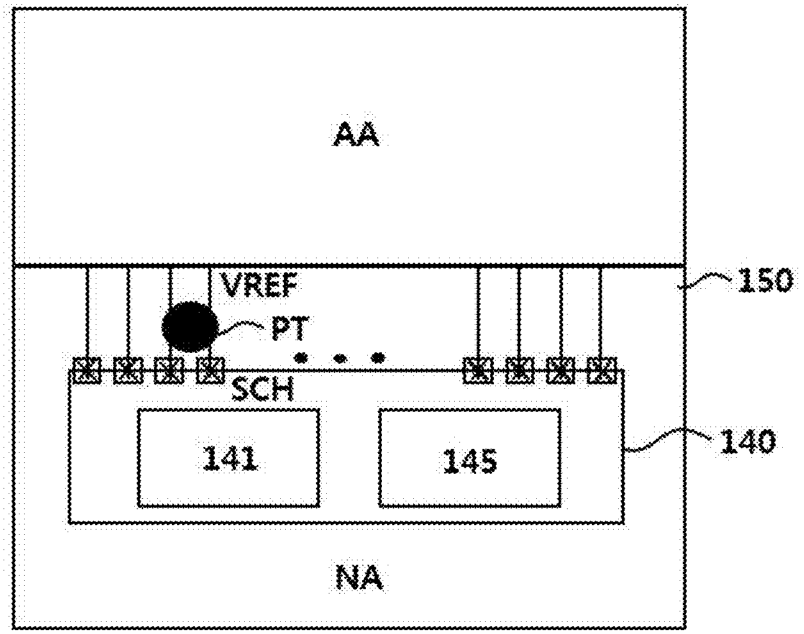

As shown in FIGS. 15 and 16, the data driver 140 may be formed in the form of an IC and mounted on a circuit board 148 or mounted on the non-active area NA of the display panel 150. However, since a reference line VREF connected to a sensing channel SCH is disposed adjacent to data lines transferring data voltages, the influence of a foreign object PT may be induced. The foreign object PT may be fine particles or fine moisture.

FIGS. 15 and 16 each show that the foreign object PT is formed between a data line adjacent to a channel of the data driver 140 and the reference line VREF as an example. However, the foreign object PT may be formed at various positions during manufacture of the LED device, such as between a data line formed in the display panel 150 rather than adjacent to a channel of the data driver 140 and the reference line VREF. Hereinafter, the influence of the foreign object PT will be described with reference to FIG. 17.

Figure 17:
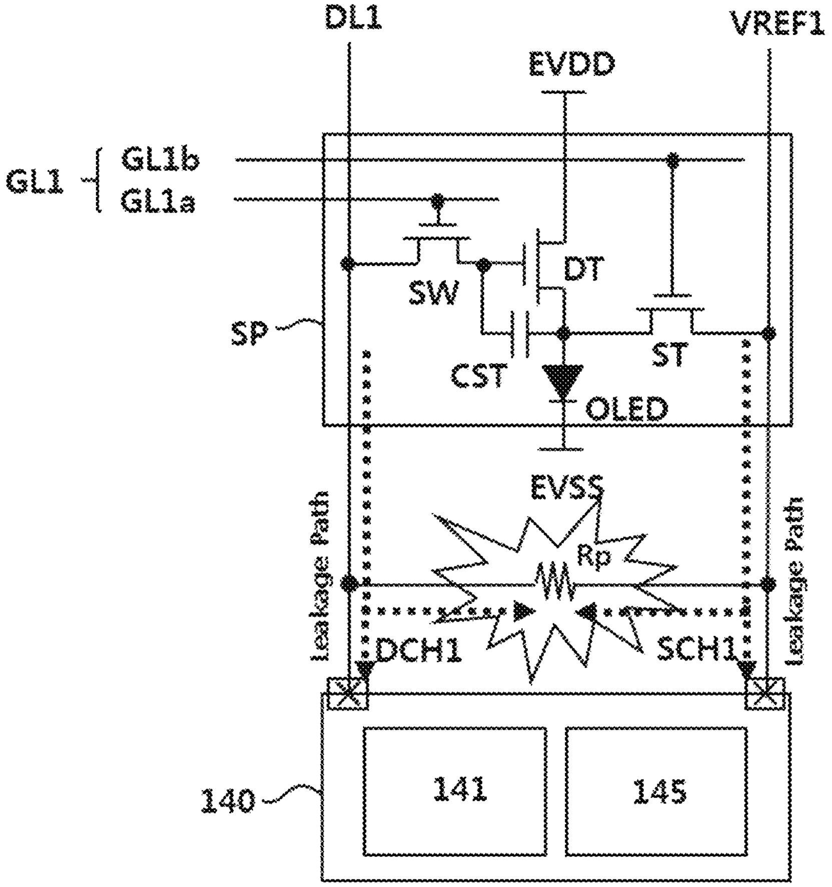

As shown in FIG. 17, a foreign object formed between the first reference line VREF1 and the first data line DL1 may act as a parasitic resistor Rp depending on given cases (material properties and size of the foreign object). In this case, a leakage path, which is an environment in which minute current can flow, may be formed between the first reference line VREF1 and the first data line DL1.

For example, a part of the data voltage applied through the first data line DL1 may leak through a circuit connected to the first reference line VREF1 through the parasitic resistor Rp. In addition, a part of the first reference voltage (reference voltage for sensing) applied through the first reference line VREF1 may leak through a circuit connected to the first data line DL1 through the parasitic resistor Rp.

Since the LED device according to the second embodiment includes a compensation circuit, even if a part of the data voltage leaks through the parasitic resistor Rp, the data voltage leak due to the parasitic resistor Rp may be compensated for to some extent based on a sensing and compensation scheme. However, when a part of the first reference voltage (reference voltage for sensing) leaks through the parasitic resistor Rp, it may have an influence (voltage discharge or noise) on a sensed value (sensed voltage), thereby causing a problem such as a decrease in compensation accuracy.

Figure 18:
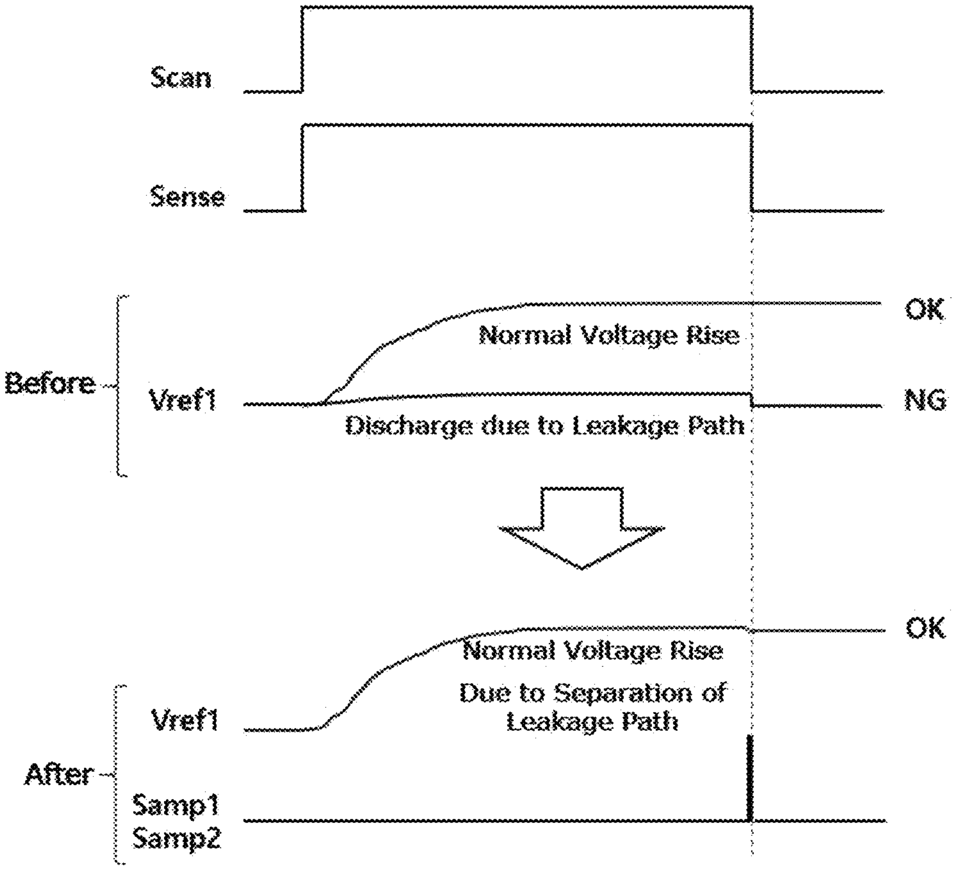

Referring to “Before” second embodiment application in FIG. 18 together with FIG. 17, a difference can be seen between a case where there is no foreign object between the first data line DL1 and the first reference line VREF1 and a case where there is a foreign object between the first data line DL1 and the first reference line VREF1. In the case where there is no foreign object, the first reference voltage Vref1 may be normally charged in the first reference line VREF1, resulting in normal voltage rise (OK). However, in the case where there is a foreign object, the first reference voltage Vref1 may not be normally charged and may be discharged due to a leakage path (NG).

Referring to “After” second embodiment application in FIG. 18 together with FIG. 17, no difference can be seen between a case where there is no foreign object between the first data line DL1 and the first reference line VREF1 and a case where there is a foreign object between the first data line DL1 and the first reference line VREF1. The reason is that the leakage path can be separated for a specific period when the second embodiment is applied. As a result, in the second embodiment, the first reference voltage Vref1 may be normally charged in the first reference line VREF1, resulting in normal voltage rise (OK).

According to the second embodiment, in order to separate the leakage path in the threshold voltage Vth sensing operation of the driving transistor DT, the sampling switch included in the sampling circuit SAM2 and the stabilization switch SAM1 included in the stabilization circuit 155 may be turned on synchronously with each other. This can be seen by referring to high voltage High generation periods of the sampling control signal Samp2 and stabilization switch signal Samp1.

In addition, as can be seen by referring to the high voltage High generation periods of the sampling control signal Samp2 and stabilization switch signal Samp1, the second embodiment may float the first reference line VREF1 for a predetermined time for electrical stabilization of the first reference line VREF1 (stabilization of the threshold voltage). Here, the predetermined time may be determined through experiments.

In addition, as can be seen by referring to the high voltage High generation periods of the sampling control signal Samp2 and stabilization switch signal Samp1, the second embodiment may minimize or at least reduce turn-on times of the sampling control signal Samp2 and stabilization switch signal Samp1 (minimize or at least reduce a leakage time) in order to sense the first reference line VREF1 as quickly as possible.

As such, the leakage path may be separated until the threshold voltage is reached, and then the sampling switch included in the sampling circuit SAM2 and the stabilization switch SAM1 included in the stabilization circuit 155 may be turned on at a time that the threshold voltage is reached, thereby making it possible to sample the threshold voltage relatively accurately. Further, a relatively accurate sensed value may be transferred to the analog-to-digital converter ADC. That is, the second embodiment may form a condition capable of acquiring a relatively accurate sensed value by minimizing the influence of the leakage path formed in the first reference line VREF1 through separation of the leakage path.

Meanwhile, although, in the second embodiment of the present disclosure, the first scan signal Scan, the second scan signal Sense, the sampling control signal Samp2 and the stabilization switch signal Samp1 are shown by way of example as all having the same falling edges, the present disclosure is not limited thereto.

Figure 19:
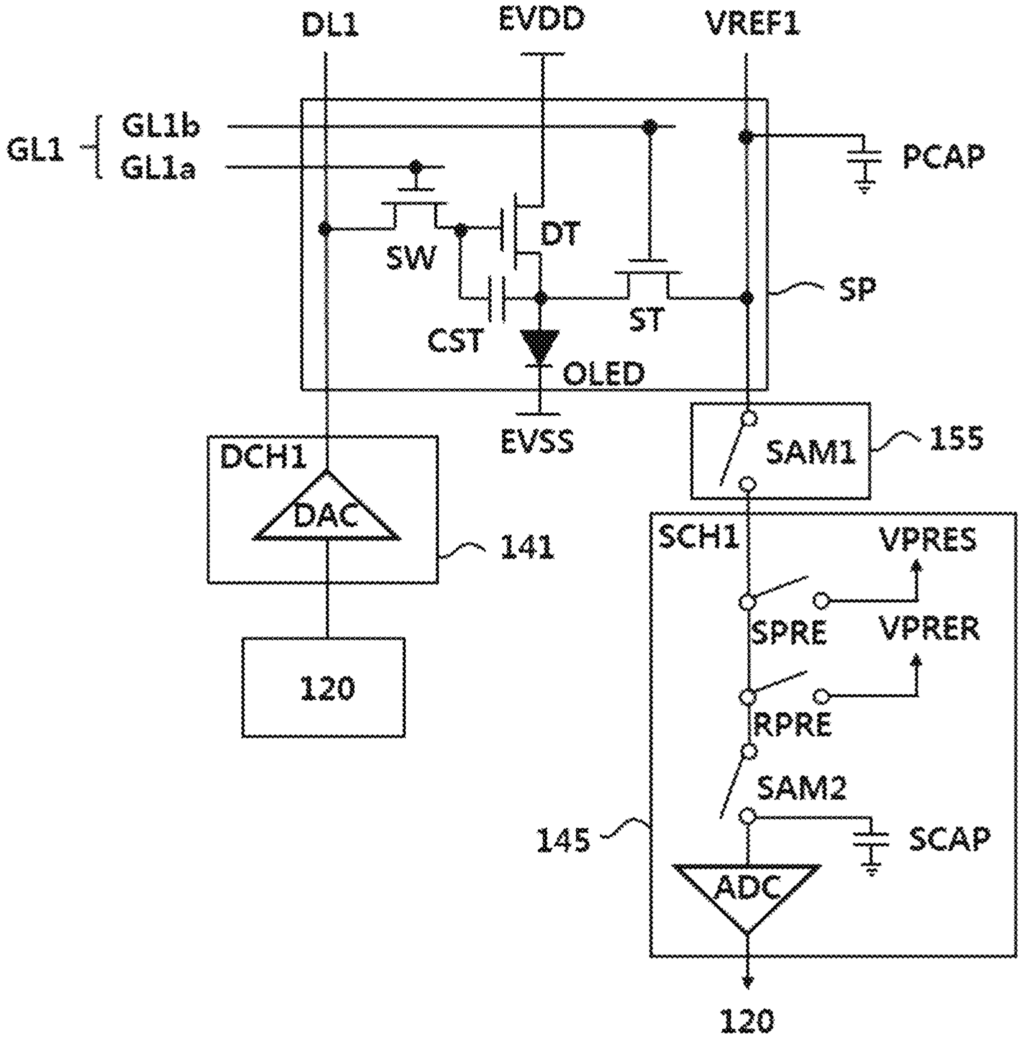
FIG. 19 is a detailed diagram of a stabilization circuit disposed adjacent to a channel of a data driver and a circuit included in the data driver according to a third embodiment of the present disclosure.
Figure 20:
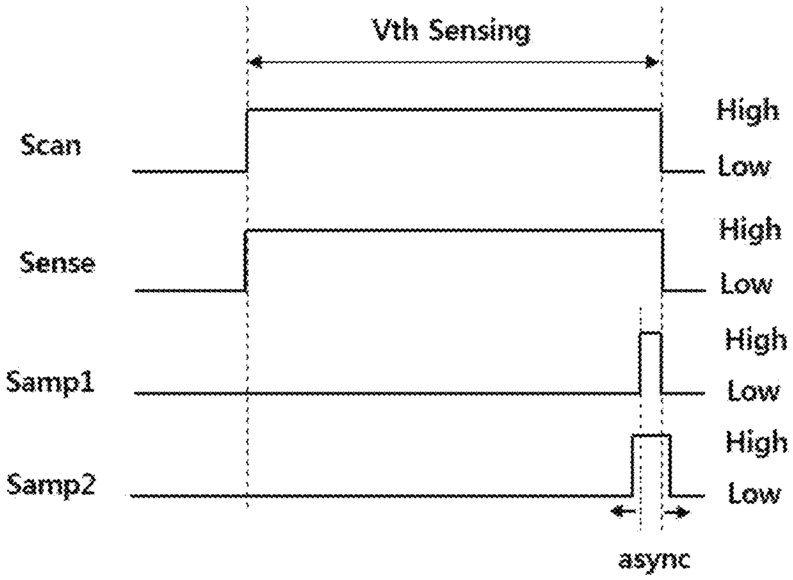
FIG. 20 is a waveform diagram illustrating a driving method according to the third embodiment of the present disclosure.
Figure 21:
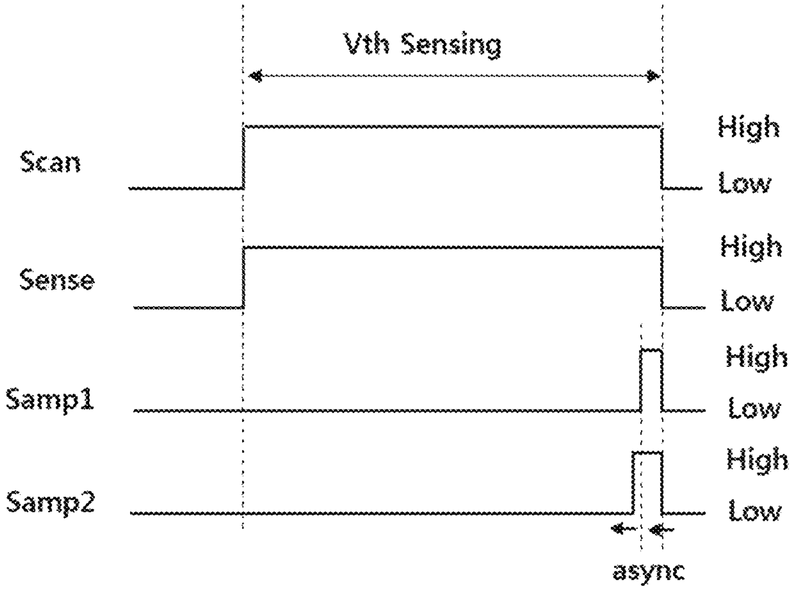
FIG. 21 is a waveform diagram illustrating a driving method according to a modification of the third embodiment of the present disclosure.

FIG. 19 is a detailed diagram of a stabilization circuit disposed adjacent to a channel of a data driver according to a third embodiment of the present disclosure and a circuit included in the data driver, FIG. 20 is a waveform diagram illustrating a driving method according to the third embodiment of the present disclosure, and FIG. 21 is a waveform diagram illustrating a driving method according to a modification of the third embodiment of the present disclosure. FIGS. 20 and 21 each illustrate a partial section (after a first reference voltage for sensing is output) of a threshold voltage Vth sensing operation of a driving transistor DT according to one embodiment.

As shown in FIGS. 19 and 20, a switching transistor SW may be turned on in response to a first scan signal Scan of a high voltage High, and a sensing transistor ST may be turned on in response to a second scan signal Sense of the high voltage High. A sampling switch included in a sampling circuit SAM2 may be temporarily turned on in response to a sampling control signal Samp2 of the high voltage High, and a stabilization switch SAM1 may be temporarily turned on in response to a stabilization switch signal Samp1.

According to the third embodiment, the stabilization switch SAM1 included in the stabilization circuit 155 may be turned on later than the sampling switch included in the sampling circuit SAM2. In addition, the stabilization switch SAM1 included in the stabilization circuit 155 may be turned off earlier than the sampling switch included in the sampling circuit SAM2. In addition, the stabilization switch SAM1 included in the stabilization circuit 155 may be turned on later and turned off earlier than the sampling switch included in the sampling circuit SAM2.

According to the third embodiment, in order to separate a leakage path in the threshold voltage Vth sensing operation of the driving transistor DT, the sampling switch included in the sampling circuit SAM2 and the stabilization switch SAM1 included in the stabilization circuit 155 may be turned on asynchronously with each other. This can be seen by referring to high voltage High generation periods of the sampling control signal Samp2 and stabilization switch signal Samp1.

Meanwhile, provided that the stabilization switch SAM1 included in the stabilization circuit 155 is turned on later and turned off earlier than the sampling switch included in the sampling circuit SAM2 as in the third embodiment, it may be possible to minimize or at least reduce a signal delay problem and a switching noise problem resulting from a parasitic RC (parasitic resistor and parasitic capacitor) component.

According to the modification of the third embodiment shown in FIG. 21, the stabilization switch SAM1 included in the stabilization circuit 155 may be turned on later than the sampling switch included in the sampling circuit SAM2 and turned off simultaneously therewith. The modification of the third embodiment may also have the same advantages as those of the third embodiment.

As is apparent from the above description, the present disclosure may minimize or at least reduce noise resulting from a foreign object or the influence thereof by electrically stabilizing a reference line used for sensing of an element included in a sub-pixel. In addition, the present disclosure may perform sensing (sampling) after electrically stabilizing the reference line and minimizing or at least reducing the influence of a leakage path. Therefore, the present disclosure may improve display quality by forming a condition capable of acquiring a relatively accurate sensed value and performing compensation based on the condition. In addition, the present disclosure may perform sensing (sampling) after minimizing a signal delay problem and a switching noise problem resulting from a parasitic RC (parasitic resistor and parasitic capacitor) component which may be induced in the reference line.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A display device comprising:
- a display panel including a sub-pixel, the sub-pixel including:
  - a driving transistor including a gate electrode, a first electrode, and a second electrode;
  - a light emitting element connected to the second electrode of the driving transistor;
  - a switching transistor connected to a gate electrode of the driving transistor and configured to supply a data voltage to the driving transistor, and
  - a sensing transistor connected to a reference line and the second electrode of the driving transistor;
- a panel driving circuit configured to supply the data voltage to the switching transistor of the sub-pixel;
- a panel sensing circuit configured to sense the sub-pixel; and
- a stabilization circuit connected to the reference line and a sensing channel of the panel sensing circuit, the stabilization circuit is turned on while the switching transistor and the sensing transistor are turned on to electrically stabilize the reference line such that charging of a voltage or current in the reference line is performed,
- wherein the panel sensing circuit comprises a sampling circuit configured to sense the sub-pixel through the reference line, and
- wherein the stabilization circuit comprises a stabilization switch configured to turn on in response to a turn-on operation of a sampling switch included in the sampling circuit.

2. The display device according to claim 1, wherein the stabilization circuit is on a board adjacent to the sensing channel of the panel sensing circuit.

3. The display device according to claim 1, wherein the stabilization circuit floats the reference line for a predetermined time.

4. The display device according to claim 1, wherein the stabilization switch having a first electrode connected to the sensing channel of the panel sensing circuit, a second electrode connected to the reference line, and a control electrode connected to a control signal line.

5. The display device according to claim 4, wherein the stabilization switch is kept turned off for a predetermined time to separate a leakage path formed in the reference line in a sensing operation of the sub-pixel, and is temporarily turned during sensing of the sub-pixel during which the switching transistor and the sensing transistor are turned on.

6. The display device according to claim 1,
- wherein the stabilization switch operates synchronously with a sampling switch included in the sampling circuit.

7. The display device according to claim 1,
- wherein the stabilization switch operates asynchronously with the sampling switch included in the sampling circuit.

8. The display device according to claim 1,
- wherein the stabilization switch is turned on later than the sampling switch included in the sampling circuit.

9. The display device according to claim 8, wherein the stabilization switch is turned on later and turned off earlier than the sampling switch included in the sampling circuit.

10. A method of driving a display device, the display device comprising a display panel having a sub-pixel that comprises a driving transistor including a gate electrode, a first electrode, and a second electrode, a light emitting element connected to the second electrode of the driving transistor, a switching transistor connected to a gate electrode of the driving transistor and configured to supply a data voltage to the driving transistor, and a sensing transistor connected to a reference line and the second electrode of the driving transistor, a panel driving circuit configured to supply the data voltage to the switching transistor of the sub-pixel, a panel sensing circuit configured to sense the sub-pixel, and a stabilization circuit connected to the reference line and a sensing channel of the panel sensing circuit, the method comprising:
- applying a reference voltage for sensing to the driving transistor through the reference line and the sensing transistor;
- turning off the stabilization circuit to float the reference line such that charging of the reference voltage for sensing applied to the reference line is performed; and
- turning on the stabilization circuit to sense the reference line, and electrically connecting the reference line and the sensing channel to each other while the switching transistor and the sensing transistor are turned on,
- wherein the panel sensing circuit comprises a sampling circuit configured to sense the sub-pixel through the reference line, and wherein the stabilization circuit comprises a stabilization switch configured to turn on in response to a turn-on operation of a sampling switch included in the sampling circuit.

11. The method according to claim 10, wherein the stabilization switch floats the reference line for a predetermined time.

12. The method according to claim 11, wherein the stabilization switch is kept turned off for a predetermined time to separate a leakage path formed in the reference line in a sensing operation of the sub-pixel, and the stabilization switch is temporarily turned on during sensing of the sub-pixel during which the switching transistor and the sensing transistor are turned on.

13. The display device of claim 1, wherein the stabilization switch connected to the reference line and configured to connect the reference line to the sensing channel and the panel sensing circuit comprises:

a first voltage circuit connected the sensing channel, the first voltage circuit configured to connect a first reference voltage source to the sensing channel while the first voltage circuit is turned on;

a second voltage circuit connected to the sensing channel, the second voltage circuit configured to connect a second reference voltage source to the sensing channel while the second voltage circuit is turned on;

an analog to digital converter; and wherein the sampling switch is connected to the sensing channel, the sampling switch configured to connect the sensing channel to the analog to digital converter while the sampling switch is turned on.

14. The display device according to claim 13, wherein the first voltage circuit and the second voltage circuit are disposed between the stabilization switch and the sampling switch.

15. The display device according to claim 1, wherein the panel sensing circuit and the panel driving circuit are included in a data driver, and wherein the stabilization switch is disposed outside the data driver and the sampling switch is disposed inside the data driver.

* * * * *